United States Patent [19]

Ishii et al.

[11] Patent Number: 5,734,322
[45] Date of Patent: Mar. 31, 1998

[54] COMMUNICATION CIRCUIT TROUBLE CHECKING APPARATUS

[75] Inventors: Shigeru Ishii, Atsugi; Yoshihide Shinso; Tateki Jozaki, both of Zama, all of Japan

[73] Assignee: Nissan Motor Co., Ltd., Yokohama, Japan

[21] Appl. No.: 628,168

[22] Filed: Apr. 5, 1996

[30] Foreign Application Priority Data

Apr. 17, 1995 [JP] Japan .................................. 7-090722

[51] Int. Cl.$^6$ .................................................. G08B 29/00
[52] U.S. Cl. .................. 340/514; 364/424.034; 364/424.038; 73/116
[58] Field of Search ........................ 340/514, 428, 340/439; 364/424.034, 424.038, 424.039; 73/116

[56] References Cited

U.S. PATENT DOCUMENTS 4,864,568  9/1989  Sato et al. ................... 364/424.039 X

*Primary Examiner*—Jeffery Hofsass
*Assistant Examiner*—Daryl L. C. Pope
*Attorney, Agent, or Firm*—Foley & Lardner

[57] ABSTRACT

An apparatus for checking a trouble in a communication circuit connected between engine and transmission control units. A check signal is produced at uniform intervals of time. The check signal is converted into a predetermined code. The converted code is transmitted through the communication circuit from one of the engine and transmission control units to the other control unit. The code transmitted to the other control unit is monitored to produce a failure signal to indicate that a trouble occurs in the communication circuit when the monitored code is not identical with the predetermined code.

6 Claims, 3 Drawing Sheets

FIG.2

| PRIORITY | CONTROL SIGNAL | OUTPUTS TO SIGNAL LINES | | |
|---|---|---|---|---|
| | | DT4 | DT2 | DT1 |
| 1 | FIRST TORQUE DOWN CONTROL SIGNAL | H | H | L |
| 2 | SECOND TORQUE DOWN CONTROL SIGNAL | H | L | L |
| 3 | THIRD TORQUE DOWN CONTROL SIGNAL | H | L | H |
| 4 | CHECK SIGNAL | H | H | H |
| 5 | RAPID DECELERATION CONTROL SIGNAL | L | L | H |
| 6 | LOCKUP CONTROL SIGNAL | L | H | L |

5,734,322

COMMUNICATION CIRCUIT TROUBLE CHECKING APPARATUS

BACKGROUND OF THE INVENTION

This invention relates to an apparatus for checking a trouble in a communication circuit connected between engine and automatic transmission control units used for general control of a power train including an engine and an automatic transmission drivingly coupled to the engine.

It is the current practice to improve the efficiency of the general control of a power train including an engine and an automatic transmission drivingly associated with the engine by employing a communication circuit to exchange information between the engine and transmission control units. Various problems will occur when the communication circuit is subject to a trouble such as signal line breakage. Upon the occurrence of such a trouble, the engine control unit cannot reduce the engine output to avoid shocks during gear shift operation in the automatic transmission. Even though the engine control unit can reduce the engine output, the engine output reduction cannot be made in synchronism with the gear shift operation. This results in a great shock during the gear shift operation.

For example, Japanese Patent Kokai No. 63-43835 discloses an apparatus for checking a trouble in a communication circuit coupled between the engine and transmission control units. However, the conventional trouble checking apparatus cannot check the trouble in the absence of a signal transmit ted through the communication circuit. For this reason, such a trouble in the communication circuit can be found after the problem occurs.

SUMMARY OF THE INVENTION

It is a main object of the invention to provide an improved trouble checking apparatus which can detect a trouble in the absence of a signal transmitted through the communication circuit.

Another object of the invention is to provide an improved trouble checking apparatus which can perform trouble checking operation after controls having a higher priority than the trouble checking operation.

There is provided, in accordance with the invention, an apparatus for checking a trouble in a communication circuit connected between engine and transmission control units used to control a power train including an engine and an automatic transmission drivingly coupled to the engine. The trouble checking apparatus comprises means for producing a check signal at uniform intervals of time, means for converting the check signal into a predetermined code, means for transmitting the converted code through the communication circuit from one of the engine and transmission control units to the other control unit, and means for monitoring the code transmitted to the other control unit to produce a failure signal to indicate that a trouble occurs in the communication circuit when the monitored code is not identical with the predetermined code.

In another aspect of the invention, the trouble checking apparatus comprises a signal selector, means for producing at least one torque down control signal to the signal selector when the engine is required to produce a reduced output, the torque down control signal having a first priority, and means for producing a check signal to the signal selector at uniform intervals of time, the check signal having a second priority lower than the first priority of the torque down control signal. The signal selector selects one of the signals having a higher priority upon simultaneous reception of at least two signals applied thereto. The trouble checking apparatus also includes means for converting the torque down control signal into a first predetermined code and the check signal into a second predetermined code, means for transmitting the converted code of the selected signal through the communication circuit from the transmission control unit to the engine control unit, and means for monitoring the code transmitted to the engine control unit to produce a failure signal to indicate that a trouble occurs in the communication circuit when the code monitored for the check signal is not identical with the second predetermined code.

In another aspect of the invention, there is provided an apparatus for checking a trouble in a communication circuit connected between engine and transmission control units used to control a power train including an engine and an automatic transmission drivingly coupled to the engine. The communication circuit has a first group of signal lines for transmitting signals from the transmission control unit to the engine control unit and a second group of signal lines for transmitting signals from the engine control unit to the transmission control unit. The trouble checking apparatus comprises means for producing a check signal at uniform intervals of time, means for converting the check signal into predetermined voltage levels developed on the respective signal lines of one of the first and second groups to transmit the check signal from one of the engine and transmission control units to the other control unit, and means for monitoring the voltage levels transmitted to the other control unit to produce a failure signal to indicate that a trouble occurs in the communication circuit when the monitored voltage levels are not identical with the respective predetermined voltage levels.

In still another aspect of the invention, the trouble checking apparatus comprises a signal selector, means for producing at least one torque down control signal to the signal selector when the engine is required to produce a reduced output, the torque down control signal having a first priority, and means for producing a check signal to the signal selector at uniform intervals of time, the check signal having a second priority lower than the first priority of the torque down control signal. The signal selector selects one of the signals having a higher priority upon simultaneous reception of at least two signals applied thereto. The trouble checking apparatus also includes means for converting the torque down control signal into a first group of predetermined voltage levels and the check signal into a second group of predetermined voltage levels, means for transmitting the converted voltage levels of the selected signal through the respective signal lines of the first group from the transmission control unit to the engine control unit, and means for monitoring the voltage levels transmitted to the engine control unit to produce a failure signal to indicate that a trouble occurs in the communication circuit when the voltage levels monitored for the check signal is not identical with the respective voltage levels of the second group.

BRIEF DESCRIPTION OF THE DRAWINGS

The invention will be described in greater detail by reference to the following description taken in connection with the accompanying drawings, in which:

FIG. 2 is a table showing the priorities and codes provided for the respective signals to be transmitted through the communication circuit from the transmission control unit to the engine control unit;

DETAILED DESCRIPTION OF THE INVENTION

Figure 1:
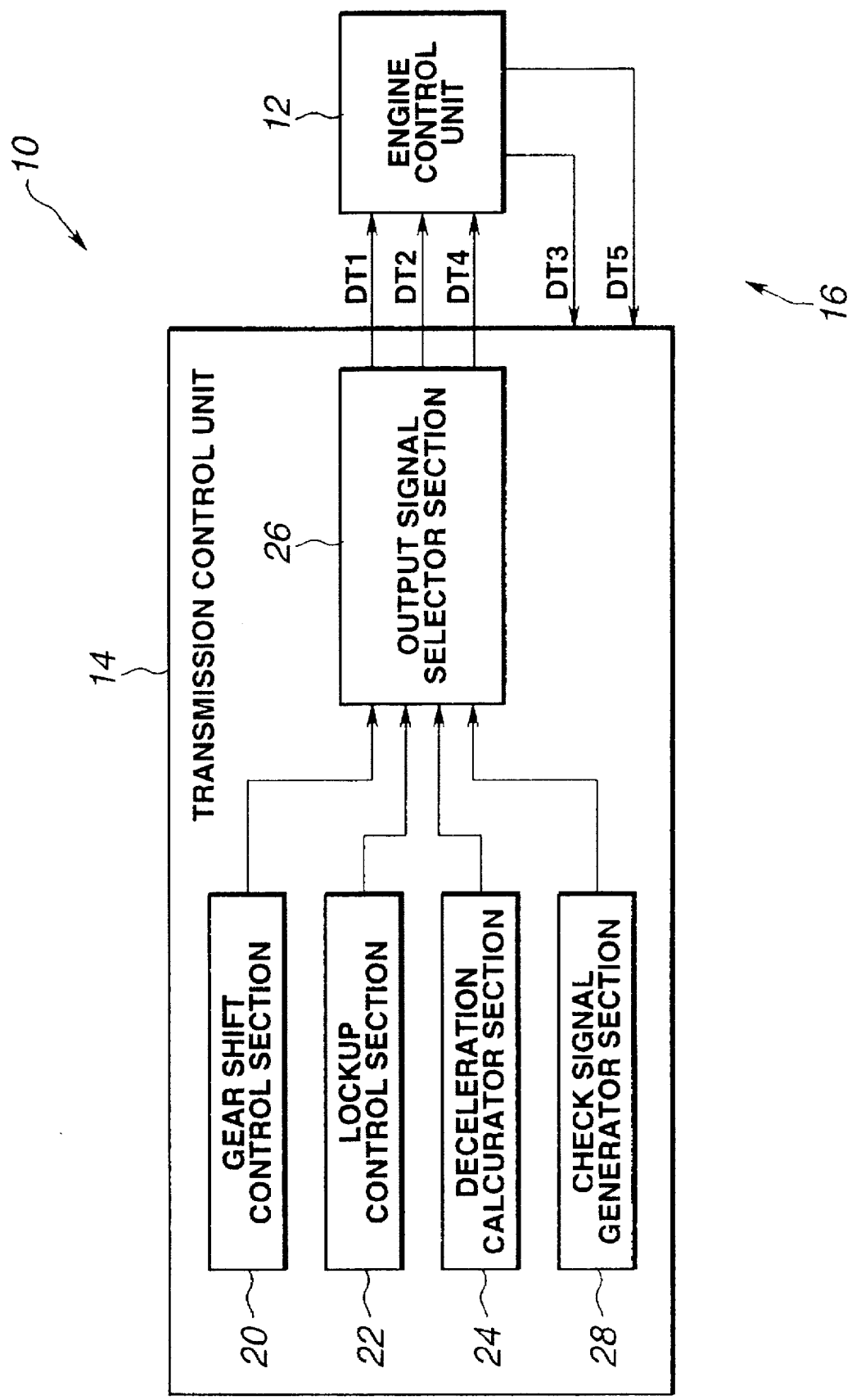
FIG. 1 is a schematic diagram showing one embodiment of a trouble checking apparatus made in accordance with the invention.

With reference to the drawings and in particular to FIG. 1, there is shown a schematic diagram of a communication circuit trouble checking apparatus embodying the invention. The trouble checking apparatus, generally designated by the numeral 10, is shown as associated with a power train general control system which includes engine and transmission control units 12 and 14 connected through a communication circuit 16. The communication circuit 16 is shown as including signal lines DT1, DT2 and DT4 through which signals are transmitted from the transmission control unit 14 to the engine control unit 12 and also signal lines DT3 and DT5 through which signals are transmitted from the engine control unit 12 to the transmission control unit 14. The engine control unit 12 utilizes the signals fed through the signal lines DT1, DT2 and DT4 from the transmission control unit 14 for various engine controls including fuel injection control, ignition control, exhaust gas recirculation (EGR) control and the like, along with other various data (not shown) inputted thereto. The transmission control unit 14 utilizes the signals fed through the signal lines DT3 and DT5 from the engine control unit 12 for various automatic transmission controls including gear shift control, lockup control, line pressure control and the like, along with other various data (not shown) inputted thereto. For this purpose, the transmission control unit 14 includes a gear shift control section 20, a lockup control section 22, a deceleration calculator section 24 and an output signal selector section 26 having inputs from these sections 20, 22 and 24. The transmission control unit 14 also includes a check signal generator section 28 connected to the output signal selector section 26.

The gear shift control section 20 produces a gear shift control signal to perform a gear shift control for the automatic transmission. The gear shift control signal includes a first torque down control signal fed through the output signal selector section 26 to the communication circuit 16, causing the engine control unit 12 to realize a small engine output reduction (torque down) for shock reduction during the gear shift operation when any change from a lower gear to a higher one is produced and a second torque down control signal fed through the output signal selector section 26 to the communication circuit 16, causing the engine control unit 12 to realize a great engine output reduction (torque down) for shock reduction during the gear shift operation when any change from a lower gear to a higher one is produced. The gear shift control signal also includes a third torque down control signal fed through the output signal selector section 26 to the communication circuit 16, causing the engine control unit 12 to realize a constant engine output reduction (torque down) for shock reduction during the gear shift operation when any change from a higher gear to a lower one is produced.

The lockup control section 22 produces a lockup control signal causing the torque converter to complete a mechanical connection between the impeller and turbine under conditions which do not require the torque fluctuation absorbing and torque increasing functions of the torque converter. While the operation of the torque converter is held in the lockup made, the lockup control signal is fed through the output signal selector section 26 to the communication circuit 16. The deceleration calculator section 24 produces a rapid deceleration control signal through the output signal selector section 26 to the communication circuit 16 when the deceleration of the automatic transmission (or engine) exceeds a predetermined value. The check signal generator section 28 produces a check signal at uniform intervals of time, for example, 2.55 seconds, for a predetermined period of time, for example, 50 msec. The check signal is fed through the output signal selector section 26 to the communication circuit 12.

The output signal selector section 26 includes memory for storing a predetermined order of priority given for the respective control signals fed thereto, as shown in FIG. 2. In the illustrated case, the first torque down control signal is given the highest priority, the second torque down control signal is given the second priority, the third torque down control signal is given the third priority, the check signal is given the fourth priority, the rapid deceleration control signal is given the fifth priority, and the lockup control signal is given the lowest priority. The output signal selector section 26 converts each of the control signals inputted thereto into output signals developed on the respective signal lines DT4, DT2 and DT1. The output signals have a code in the form of a voltage level(s) determined according to the predetermined order of priority.

In the illustrated embodiment, the first torque down control signal having the first priority is converted into a code represented by a high level voltage signal (H) developed on the signal line DT4, a high level voltage signal (H) developed on the signal line DT2, and a low level voltage signal (L) developed on the signal line DT1. The second torque down control signal having the second priority is converted into a code represented by a high level voltage signal (H) developed on the signal line DT4, a low level voltage signal (L) developed on the signal line DT2, and a low level voltage signal (L) developed on the signal line DT1. The third torque down control signal having the third priority is converted into a code represented by a high level voltage signal (H) developed on the signal line DT4, a low level voltage signal (L) developed on the signal line DT2, and a high level voltage signal (H) developed on the signal line DT1. The check signal having the fourth priority is converted into a code represented by a high level voltage signal (H) developed on the signal line DT4, a high level voltage signal (H) developed on the signal line DT2, and a high level voltage signal (H) developed on the signal line DT1. The rapid deceleration control signal having the fifth priority is converted into a code represented by a low level voltage signal (L) developed on the signal line DT4, a low level voltage signal (L) developed on the signal line DT2, and a high level voltage signal (H) developed on the signal line DT1. The lockup control signal having the sixth priority is converted into a code represented by a low level voltage signal (L) developed on the signal line DT4, a high level voltage signal (H) developed on the signal line DT2, and a low level voltage signal (L) developed on the signal line DT1.

Figure 3:
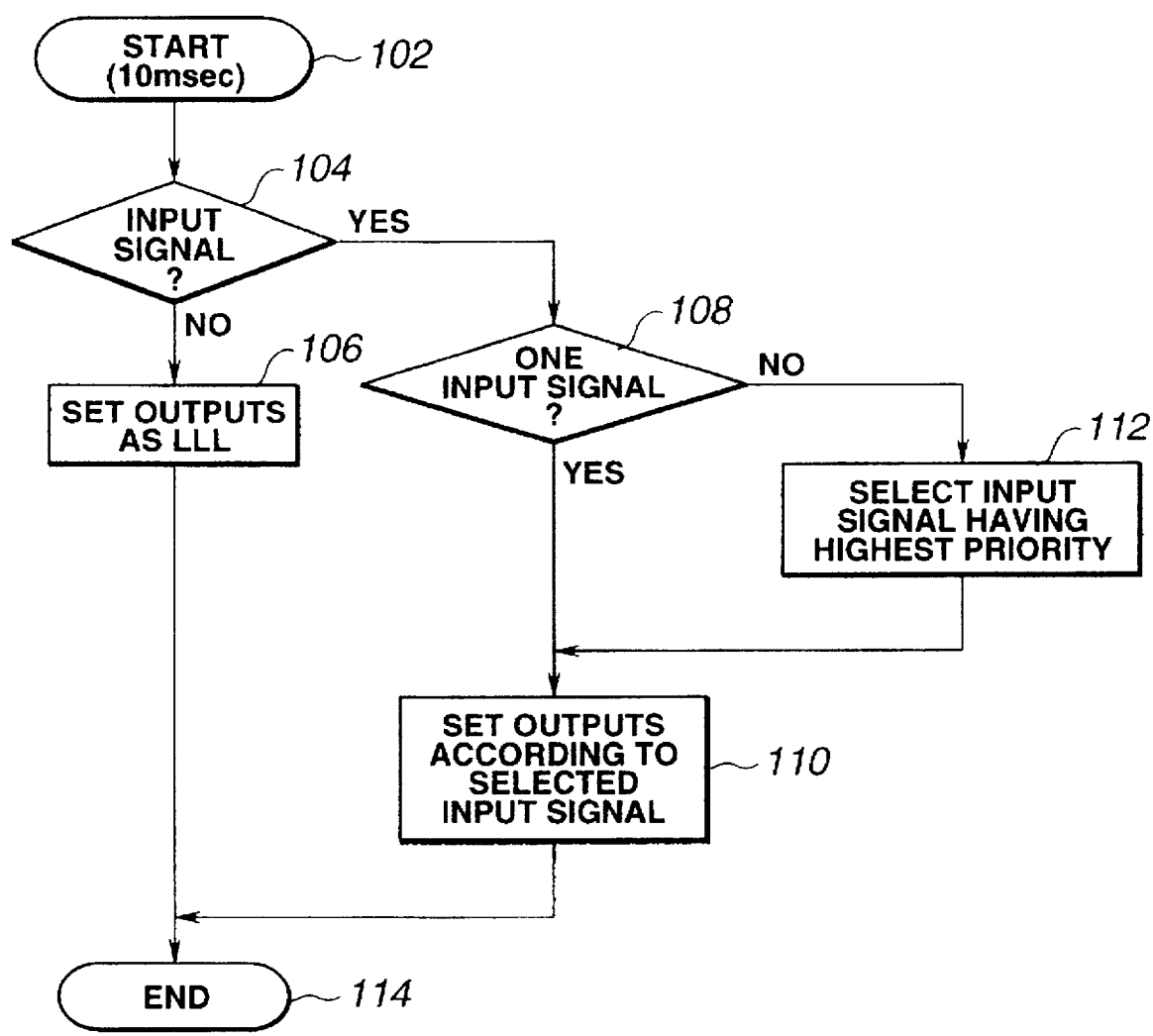
FIG. 3 is a flow diagram showing the programming of the digital computer as it is used to determine the code to be transferred to the communication circuit.

FIG. 3 is a flow diagram illustrating the programming of the digital computer as it is used in the output signal selector section 26 to determine the levels of the voltage signals outputted on the respective signal lines DT4, DT2 and DT1 of the communication circuit 16. The computer program is entered at the point 102 at uniform intervals of time, for example, 10 msec. At the point 104 in the program, a determination is made as to whether or not there exists a control signal inputted to the output signal selector section 26. If the answer to this question is "no", then the program proceeds to the point 106 where all of the output voltages developed on the respective signal lines DT4, DT2 and DT1 are set at the low level (L). Following this, the program proceeds to the end point 114. In this case, the engine control unit 12 controls the engine without regard to the signals fed thereto from the communication circuit 16.

If the answer to the question inputted at the point 104 is "yes", then the program proceeds to another determination step at the point 108. This determination is as to whether or not there exists only one signal inputted to the output signal selector section 26. If the answer to this question is "yes", then the program proceeds to the point 110 where the levels of the output voltages developed on the respective signal lines DT4, DT2 and DT1 are specified according to the control signal inputted to the output signal selector section 26, as described in connection with FIG. 2. In this case, the engine control unit 12 controls the engine with regard to the signals fed thereto from the communication circuit 16. Otherwise, the program proceeds to the point 112 where one of the control signals having the highest priority is selected and then to the point 110 where the levels of the output voltages developed on the respective signal lines DT4, DT2 and DT1 are specified according to the selected control signal, as described in connection with FIG. 2. In this case, the engine control unit 12 controls the engine with regard to the signals corresponding to the selected control signal. Following this, the program proceeds to the end point 114.

The engine control unit 12 monitors the voltage levels of the signals developed on the respective signal lines DT4, DT2 and DT1. It is now assumed that the output signal selector section 26 sets the high level (H) for all of the voltage signals developed on the respective signal lines DT4, DT2 and DT1 in response to a check signal inputted thereto from the check signal generator section 28. The engine control unit 12 determines that all of the signal lines DT4, DT2 and DT1 are normal when the voltage levels of all of the signals developed on the respective signal lines DT4, DT2 and DT1 are high (H). If the voltage level of any one of the signals developed on the respective signal lines DT4, DT2 and DT1 is low (L), the engine control unit 12 determines a trouble in the corresponding one of the signal lines DT4, DT2 and DT1 and produces a signal indicating the trouble.

Since a check signal is produced at uniform intervals of time in addition to the control signals, it is possible to check such a trouble which may be produced in the signal lines DT4, DT2 and DT1 even when no control signal is produced to the communication circuit 16.

Upon the simultaneous occurrence of the check signal and at least one of the torque down control signals, the torque down control signal is selected prior to the check signal. It is, therefore, possible to perform a torque down control having a higher priority with no delay before the trouble check. Upon the simultaneous occurrence of the check signal and the lockup control signal, however, the check signal is selected prior to the lockup control signal having a priority lower than that of the check signal. It is, therefore, possible to perform a trouble check without any delay before the control having a lower priority.

While the invention has been described in connection with the engine control unit 12 operable as a unit for checking a trouble in the signal lines DT1, DT2 and DT4 through which signals are transmitted from the transmission control unit 14 to the engine control unit 12, it is to be understood, of course, that the invention is equally applicable to check a trouble in the signal lines DT3 and DT5 through which signals are transmitted from the engine control unit 12 to the transmission control unit 14.

What is claimed is:

1. An apparatus for checking a trouble in a communication circuit having a plurality of signal lines each of which is connected to apply a control signal capable of being at either a first level or a second level between engine and transmission control units used to control a power train including an engine and an automatic transmission drivingly coupled to the engine, the trouble checking apparatus comprising:

transmitting unit configured to transmit a check signal having the second level through each of the signal lines, at uniform intervals of time, from one of the engine and transmission control units to a remaining one of the engine and transmission control units; and a monitoring unit coupled to the signal lines and configured to monitor the levels of the respective check signals transmitted to the remaining control unit to produce a failure signal to indicate that a trouble occurs in the communication circuit when all of the monitored levels of the respective check signals transmitted to the remaining control unit to produce a failure signal to indicate that a trouble occurs in the communication circuit when all of the monitored levels are at the second level.

2. An apparatus for checking a trouble in a communication circuit connected between engine and transmission control units used to control a power train including an engine and an automatic transmission drivingly coupled to the engine, the trouble checking apparatus comprising:

a signal selector;

means for producing at least one torque down control signal to the signal selector when the engine is required to produce a reduced output, the torque down control signal having a first priority;

means for producing a check signal to the signal selector at uniform intervals of time, the check signal having a second priority lower than the first priority of the torque down control signal;

the signal selector selecting one of the signals having a higher priority upon simultaneous reception of at least two signals applied thereto;

means for converting the torque down control signal into a first predetermined code and the check signal into a second predetermined code;

means for transmitting the converted code of the selected signal through the communication circuit from the transmission control unit to the engine control unit; and means for monitoring the code transmitted to the engine control unit to produce a failure signal to indicate that a trouble occurs in the communication circuit when the code monitored for the check signal is not identical with the second predetermined code.

3. The trouble checking apparatus as claimed in claim 2, wherein the transmission control unit includes means for producing a lockup control signal to the signal selector, the lockup control signal having a priority lower than the priority of the check signal.

4. An apparatus for checking a trouble in a communication circuit connected between engine and transmission control units used to control a power train including an engine and an automatic transmission drivingly connected to the engine, the communication circuit having a first group of signal lines for transmitting data signals from the transmission control unit to the engine control unit and a second group of signal lines for transmitting data signals from the engine control unit to the transmission control unit, the trouble checking apparatus comprising:

means for producing a check signal at uniform intervals of time;

means for converting the check signal into predetermined voltage levels developed on the respective signal lines of one of the first and second groups to transmit the check signal from one of the engine and transmission control units to a remaining one of the engine and transmission control units; and means for monitoring the voltage levels transmitted to the remaining control unit to produce a failure signal to indicate that a trouble occurs in the communication circuit when the monitored voltage levels are not identical with the respective predetermined voltage levels.

5. An apparatus for checking a trouble in a communication circuit connected between engine and transmission control units used to control a power train including an engine and an automatic transmission drivingly coupled to the engine, the communication circuit having a first group of signal lines for transmitting signals from the transmission control unit to the engine control unit and a second group of signal lines for transmitting signals from the engine control unit to the transmission control unit, the trouble checking apparatus comprising:

a signal selector;

means for producing at least one torque down control signal to the signal selector when the engine is required to produce a reduced output, the torque down control signal having a first priority;

means for producing a check signal to the signal selector at uniform intervals of time, the check signal having a second priority lower than the first priority of the torque down control signal;

the signal selector selecting one of the signals having a higher priority upon simultaneous reception of at least two signals applied thereto;

means for converting the torque down control signal into a first group of predetermined voltage levels and the check signal into a second group of predetermined voltage levels;

means for transmitting the converted voltage levels of the selected signal through the respective signal lines of the first group from the transmission control unit to the engine control unit; and means for monitoring the voltage levels transmitted to the engine control unit to produce a failure signal to indicate that a trouble occurs in the communication circuit when the voltage levels monitored for the check signal is not identical with the respective voltage levels of the second group.

6. The trouble checking apparatus as claimed in claim 1, wherein the first level is a low level, and the second level is a high level.

* * * * *